(12) United States Patent
Yanai et al.

(10) Patent No.: US 9,778,065 B2
(45) Date of Patent: Oct. 3, 2017

(54) GRADIENT INFORMATION ACQUISITION METHOD, STORAGE MEDIUM, GRADIENT INFORMATION ACQUISITION DEVICE AND PROGRAM

(71) Applicant: MITSUBISHI HEAVY INDUSTRIES, LTD., Tokyo (JP)

(72) Inventors: Noritaka Yanai, Tokyo (JP); Hiroyuki Takaki, Tokyo (JP); Toshihiko Niinomi, Tokyo (JP); Yasuyuki Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 597 days.

(21) Appl. No.: 14/374,040

(22) PCT Filed: Nov. 9, 2012

(86) PCT No.: PCT/JP2012/079150
§ 371 (c)(1),
(2) Date: Jul. 23, 2014

(87) PCT Pub. No.: WO2013/111421
PCT Pub. Date: Aug. 1, 2013

(65) Prior Publication Data
US 2014/0365165 A1 Dec. 11, 2014

(30) Foreign Application Priority Data

Jan. 27, 2012 (JP) ................................ 2012-015706

(51) Int. Cl.
*G01P 5/00* (2006.01)
*G01P 7/00* (2006.01)
(Continued)

(52) U.S. Cl.
CPC ............... *G01C 23/00* (2013.01); *B61K 9/08* (2013.01); *B61L 23/047* (2013.01); *B61L 23/048* (2013.01); *B61L 99/00* (2013.01)

(58) Field of Classification Search
CPC ............. G06Q 10/0639; G06Q 10/105; G06Q 30/0241; G05B 15/02; G05B 19/048; G05B 19/186; G05B 19/416; G05B 19/4163
See application file for complete search history.

(56) References Cited

U.S. PATENT DOCUMENTS

| 5,157,840 A | 10/1992 | Henttinen |
| 2008/0059033 A1* | 3/2008 | Yamada ............... G01M 17/007 701/70 |

(Continued)

FOREIGN PATENT DOCUMENTS

| CN | 101314932 A | 12/2008 |
| CN | 201746752 U | 2/2011 |

(Continued)

OTHER PUBLICATIONS

Office Action dated Feb. 2, 2015 in corresponding Chinese Application No. 201280064391.2 (with English translation of Search Report).

(Continued)

*Primary Examiner* — Roy Y Yi
(74) *Attorney, Agent, or Firm* — Wenderoth, Lind & Ponack, L.L.P.

(57) ABSTRACT

Disclosed is a gradient information acquisition method comprising: a speed measured value acquisition step in which a measured value of the speed of a rail vehicle is acquired; a speed calculation step in which a calculated value of the speed of said vehicle is found using an equation of movement including a parameter indicating the gradient of the path of travel of said rail vehicle; a parameter value acquisition step in which a parameter value is found of a function indicating said gradient, for which parameter the difference of said measured value of the speed and said calculated value of the speed is a minimum; and a gradient (Continued)

information acquisition step of finding the gradient of said path of travel, based on the parameter value of the function indicating said gradient that was acquired in said parameter value acquisition step.

6 Claims, 9 Drawing Sheets

(51) Int. Cl.
| | | |
|---|---|---|
| *G01P 9/00* | (2012.01) | |
| *G01P 11/00* | (2006.01) | |
| *G01C 23/00* | (2006.01) | |
| *B61K 9/08* | (2006.01) | |
| *B61L 99/00* | (2006.01) | |
| *B61L 23/04* | (2006.01) | |

(56) References Cited

U.S. PATENT DOCUMENTS

| | | | |
|---|---|---|---|
| 2010/0101265 A1* | 4/2010 | Yokouchi | F04D 27/004 62/426 |
| 2010/0154233 A1 | 6/2010 | Theurer et al. | |

FOREIGN PATENT DOCUMENTS

| | | |
|---|---|---|
| JP | 5-97035 | 4/1993 |
| JP | 2001-55144 | 2/2001 |
| JP | 2009-192504 | 8/2009 |
| JP | 4619890 | 1/2011 |
| WO | 2006/031774 | 3/2006 |

OTHER PUBLICATIONS

Jia-xing G. Chen, "Modeling the Energy-Saving Train Control Problems with a Long-Haul Train", Department of Computer Science, Anhui University, Hefei 230039, China, vol. 11, No. 4, Aug. 1999, pp. 286-288 (with English abstract).

International Search Report dated Feb. 19, 2013 in corresponding International Application No. PCT/JP2012/079150.

Translation of Written Opinion of the International Searching Authority dated Feb. 19, 2013 in corresponding International Application No. PCT/JP2012/079150.

* cited by examiner

GRADIENT INFORMATION ACQUISITION METHOD, STORAGE MEDIUM, GRADIENT INFORMATION ACQUISITION DEVICE AND PROGRAM

TECHNICAL FIELD

The present invention relates to a gradient information acquisition method, a storage medium, a gradient information acquisition device, and a program.

Priority is claimed on Japanese Patent Application No. 2012-015706, filed Jan. 27, 2012, the content of which is incorporated herein by reference.

BACKGROUND ART

In a digital automatic train control (ATC) scheme that has recently become mainstream, a control device mounted in a railroad vehicle generates a brake pattern based on a gradient or a performance of the railroad vehicle. For this reason, gradient information needs to be provided to (stored in) the control device of the railroad vehicle in advance.

Here, tracks are not necessarily constructed according to drawings. For this reason, after tracks are completely constructed, it is necessary to actually measure a gradient and provide an actual measurement value to the control device as gradient information.

In connection with actual measurement of the gradient, a device for detecting and inspecting maintenance facility data disclosed in Patent Literature 1 includes an irradiating device and a light receiving device which are attached to roofs of front and rear vehicles in the composition of an inspection car in which a plurality of vehicles are connected. Further, directions of the devices are automatically changed so that light from the irradiating device is consistently received by the light receiving device, a curvature radius and a gradient amount are calculated based on a shift amount obtained by measuring a change angle from the positions of the irradiating device and the light receiving device when the vehicle composition of the inspection car in which a plurality of vehicles are connected is arranged along a horizontal straight line, and track maintenance facility data including curved line information and gradient information of a route shape is detected.

Then, as the inspection car travels, track maintenance facility data including bifurcation information as well as curved line information can be acquired, and thus time and effort taken to measure bifurcation information are saved. In addition, by comparison with obtained data, previous track maintenance facility data can be inspected, and thus reliability of data can be improved, and a problem can be detected early.

PRIOR ART LITERATURE

Patent Literature

[Patent Literature 1]
  Japanese Patent Publication No. 4619890

DISCLOSURE OF INVENTION

Problems to be Solved by the Invention

However, a method of detecting maintenance facility data using the device for detecting and inspecting the maintenance facility data disclosed in Patent Literature 1 incurs development costs, manufacturing costs, and local transportation costs of the dedicated inspection car mounted in the inspection device. As described above, in this method, high costs are incurred, and it is unrealistic to use the method, particularly in a small transportation system.

Further, when the inspection car is not used, measuring a gradient by manpower is considered. However, it takes a long time to measure a gradient by manpower.

The present invention was made in light of the foregoing, and it is an object of the present invention to provide a gradient information acquisition method, a gradient information acquisition device, and a program, which are capable of obtaining gradient information in a relatively short period of time without requiring a dedicated inspection car, and a storage medium storing obtained gradient information.

Means for Solving the Problems

The invention was made to solve the above problems, and a gradient information acquisition method according to an aspect of the present invention includes a speed measurement value acquiring step of acquiring a measurement value of a speed of a railroad vehicle, a speed calculating step of obtaining a calculation value of the speed of the railroad vehicle using an equation of motion including a function representing a gradient of a travel route of the railroad vehicle, a parameter value acquiring step of obtaining a parameter value of the function representing the gradient, the parameter value minimizing a difference between the calculation value of the speed and the measurement value of the speed, and a gradient information acquiring step of obtaining the gradient of the travel route based on the parameter value of the function representing the gradient acquired in the parameter value acquiring step.

Further, in a gradient information acquisition method according to an aspect of the present invention, in the gradient information acquisition method, the speed measuring step further includes a speedometer measurement value acquiring step of acquiring the measurement value of the speed of the railroad vehicle by a speedometer, a traveling time acquiring step of acquiring information of a time at which the railroad vehicle travels at a certain position, and a speedometer measurement value correcting step of correcting the measurement value of the speedometer based on data acquired in the traveling time acquiring step and obtaining the measurement value of the speed of the railroad vehicle.

Further, in a gradient information acquisition method according to an aspect of the present invention, the gradient information acquisition method further includes a zone deciding step of deciding a zone in which a gradient is obtained by the gradient information acquisition method in a travel route of a gradient acquisition target.

Further, in a gradient information acquisition method according to an aspect of the present invention, in the gradient information acquisition method, in the zone deciding step, the zone in which the gradient is obtained by the gradient information acquisition method is decided in both directions of the travel route of the gradient acquisition target.

Further, a storage medium according to an aspect of the present invention stores information indicating a gradient obtained by executing any of the above gradient information acquisition methods.

Further, a gradient information acquisition device according to an aspect of the present invention includes a speed measurement value acquiring unit configured to acquire a measurement value of a speed of a railroad vehicle, a speed calculating unit configured to obtain a calculation value of the speed of the railroad vehicle using an equation of motion including a function representing a gradient of a travel route of the railroad vehicle, a parameter value acquiring unit configured to obtain a parameter value of the function representing the gradient, the parameter value minimizing a difference between the calculation value of the speed and the measurement value of the speed, and a gradient information acquiring unit configured to obtain the gradient of the travel route based on the parameter value of the function representing the gradient acquired by the parameter value acquiring unit.

Further, a program according to an aspect of the present invention causes a computer functioning as a gradient information acquisition device to execute a speed measuring step of acquiring a measurement value of a speed of a railroad vehicle, a speed calculating step of obtaining a calculation value of the speed of the railroad vehicle using an equation of motion including a function representing a gradient of a travel route of the railroad vehicle, a parameter value acquiring step of obtaining a parameter value of the function representing the gradient, the parameter value minimizing a difference between the calculation value of the speed and the measurement value of the speed, and a gradient information acquiring step of obtaining the gradient of the travel route based on the parameter value of the function representing the gradient acquired in the parameter value acquiring step.

Effects of the Invention

According to the present invention, it is possible to obtain gradient information in a relatively short period of time without requiring a dedicated inspection car.

PREFERRED EMBODIMENTS FOR CARRYING OUT THE INVENTION

Figure 1:
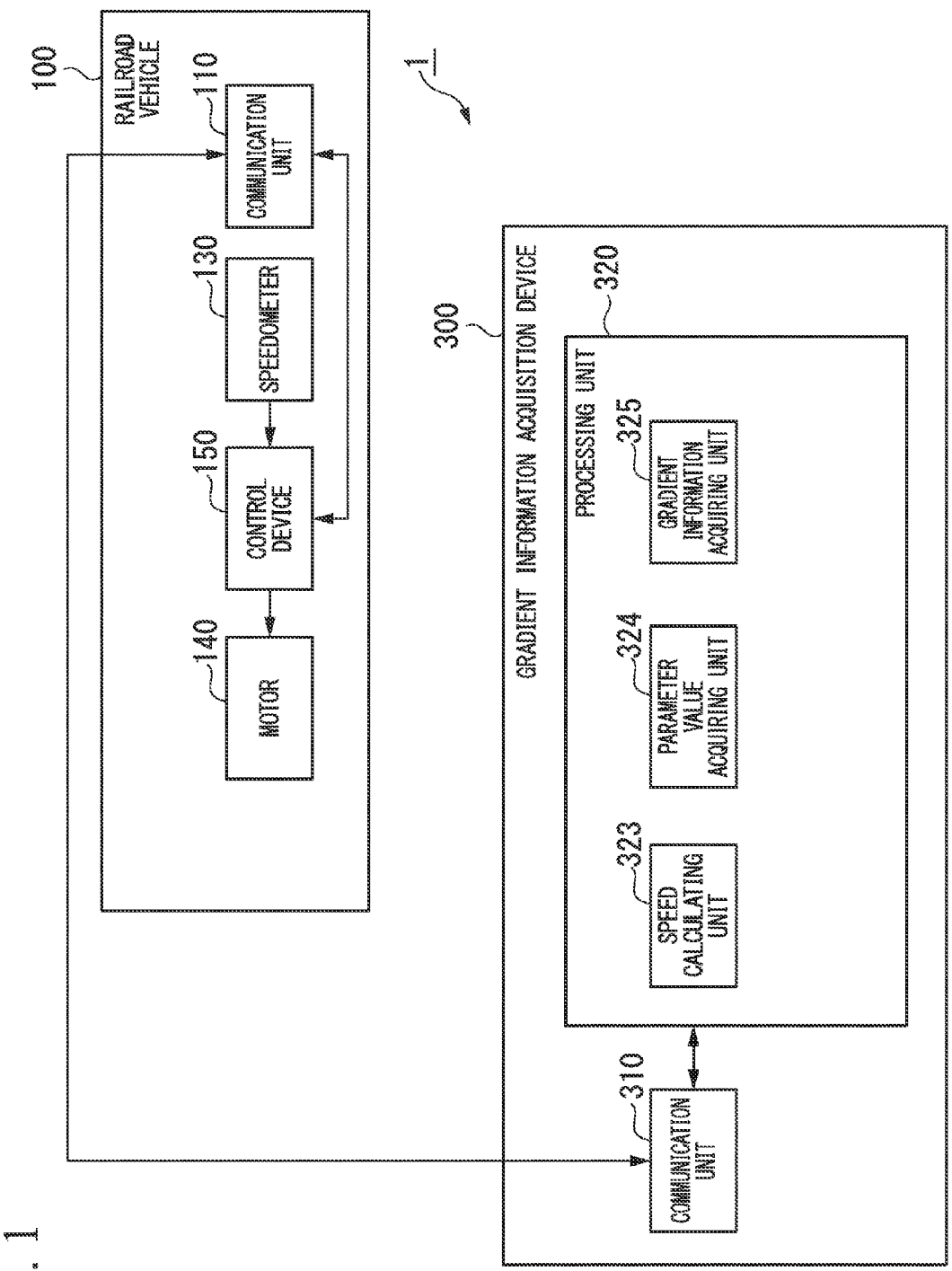
FIG. 1 is a schematic block diagram illustrating a functional configuration of a gradient information acquisition system according to an embodiment of the present invention.

Hereinafter, exemplary embodiments of the present invention will be described with reference to the appended drawings. FIG. 1 is a schematic block diagram illustrating a functional configuration of a gradient information acquisition system according to an embodiment of the present invention. Referring to FIG. 1, a gradient information acquisition system 1 includes a railroad vehicle 100 and a gradient information acquisition device 300.

The railroad vehicle 100 includes a communication unit (speed measurement value acquiring unit) 110, a speedometer 130, a motor 140, and a control device 150. The gradient information acquisition device 300 includes a communication unit 310 and a processing unit 320. The processing unit 320 includes a speed calculating unit 323, a parameter value acquiring unit 324, and a gradient information acquiring unit 325.

The railroad vehicle 100 is a railroad vehicle capable of traveling on a track of a gradient measurement target. The railroad vehicle 100 travels by rotating the motor 140, and transmits speed information of the railroad vehicle 100 and information (for example, a notch step command value; hereinafter referred to as "motor operation state information") indicating an operation state of the motor 140 to the gradient information acquisition device 300.

Here, the speed information of the railroad vehicle 100 and the motor operation state information can be acquired by a normal vehicle (a vehicle used for a normal business operation). Thus, a normal vehicle may be used as the railroad vehicle 100, and it is unnecessary to prepare a dedicated vehicle for acquiring gradient information.

Here, the railroad vehicle is typically a train but may be a railroad vehicle which travels not connected.

The communication unit 110 performs communication with the gradient information acquisition device 300 (the communication unit 310). Particularly, the communication unit 110 transmits the speed information of the railroad vehicle 100 and the motor operation state information to the gradient information acquisition device 300.

The speedometer 130 measures the speed of the railroad vehicle 100, and outputs the obtained measurement value to the control device 150. For example, the speedometer 130 measures the speed of the railroad vehicle 100 based on revolutions per unit time of the wheel of the railroad vehicle 100.

The motor 140 rotates a shaft (rotor) of the motor 140 according to control of the control device 150, rotates the wheel of the railroad vehicle 100, and causes the railroad vehicle 100 to travel.

The control device 150 controls, for example, the motor 140 or a braking device equipped in the railroad vehicle 100 according to an operation of an operator of the railroad vehicle 100 or the like. Further, the control device 150 outputs the notch step command value serving as the motor operation state information and the speed information of the railroad vehicle 100 measured by the speedometer 130 to the communication unit 110 to be transmitted to the gradient information acquisition device 300.

The gradient information acquisition device 300 acquires gradient information of the track (the travel route of the railroad vehicle 100). Specifically, the gradient information acquisition device 300 performs a calculation (a traveling simulation of the railroad vehicle 100) of the speed of the railroad vehicle 100 using an equation of motion (that is, an equation of motion representing a gradient of a track by a function) including a function representing a gradient of the travel route of the railroad vehicle 100. Further, the gradient information acquisition device 300 decides a parameter of a function representing a track gradient so that a difference between the calculation value of the speed and the measurement value of the speed of the railroad vehicle 100 is minimum, and acquires (calculates) the gradient information.

The gradient information acquired by the gradient information acquisition device 300 is used, for example, when the control device 150 calculates a speed limit in digital ATC.

The communication unit 310 acquires information such as the measurement value of the speed of the railroad vehicle 100. Specifically, the communication unit 310 receives the speed information representing the speed of the railroad vehicle 100 measured by the speedometer 130 and the motor operation state information through the control device 150 and the communication unit 110. Further, a processing step of acquiring the measurement value of the speed of the railroad vehicle 100 through the communication unit 310 corresponds to a step of acquiring a speed measurement value in the present invention.

Further, the present invention does not depend on a method of acquiring information (for example, the speed information) from the railroad vehicle 100 through the gradient information acquiring unit 300. Thus, various methods can be used as a method of acquiring information from the railroad vehicle 100 through the gradient information acquiring unit 300. Particularly, the gradient information acquiring unit 300 may not acquire information from the railroad vehicle 100 in real time. For example, the gradient information acquiring unit 300 may acquire information from the railroad vehicle 100 through a recording medium such as a Universal Serial Bus (USB) or a flash memory.

For example, as a central processing unit (CPU) equipped in the gradient information acquisition device 300 reads a program from a storage medium equipped in the gradient information acquisition device 300 and executes the program, the processing unit 320 is implemented, controls respective components of the gradient information acquisition device 300, and executes various kinds of processing.

The speed calculating unit 323 obtains the calculation value of the speed of the railroad vehicle 100 (simulates traveling of the railroad vehicle 100) using an equation of motion including a function representing the gradient of the travel route of the railroad vehicle 100. Further, a processing step of obtaining the calculation value of the speed of the railroad vehicle 100 using the equation of motion through the speed calculating unit 323 corresponds to a step of calculating the speed in the present invention.

The parameter value acquiring unit 324 obtains a parameter value that minimizes a difference between the calculation value of the speed obtained by the speed calculating unit 323 and the measurement value of the speed acquired by the communication unit 310 as a parameter value of the function representing the gradient of the travel route of the railroad vehicle 100. Further, a processing step of obtaining the parameter value that minimizes the difference between the calculation value of the speed and the measurement value of the speed through the parameter value acquiring unit 324 corresponds to a step of acquiring a parameter value in the present invention.

The gradient information acquiring unit 325 obtains a gradient of the travel route based on the parameter value of the function representing the gradient acquired by the parameter value acquiring unit 324. Further, a processing step of obtaining the gradient of the travel route based on the parameter value of the function representing the gradient acquired by the parameter value acquiring unit 324 through the gradient information acquiring unit 325 corresponds to a step of acquiring gradient information in the present invention.

Next, a process of acquiring gradient information through the gradient information acquisition device 300 will be described in further detail with reference to FIGS. 2 to 4.

Figure 2:
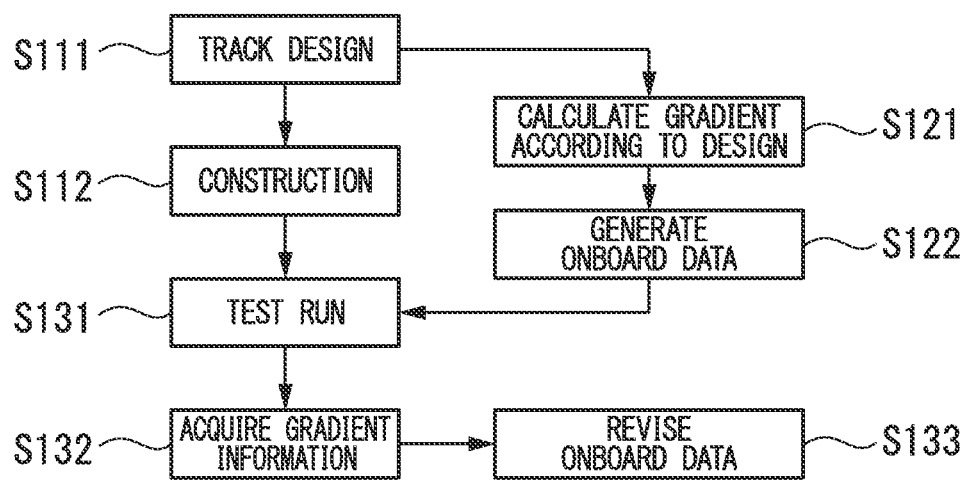
FIG. 2 is an explanatory diagram illustrating an exemplary working process for track opening according to the same embodiment.

FIG. 2 is an explanatory diagram illustrating an exemplary working process for track opening. In the working process illustrated in FIG. 2, a worker (a person who installs a track and performs an adjustment for traveling of a railroad vehicle) first designs a track to be opened (step S111). Particularly, the worker decides the position at which a rail of a track is laid, and decides a specification or an installation place of each device installed in the track. Here, the track to be opened corresponds to a track of a gradient information acquisition target by the gradient information acquisition device 300.

Then, the worker performs the construction (for example, installation of a rail and each device or wiring between devices) based on the design in step S111 (step S112).

Further, the worker calculates a gradient according to the design of the track to be opened based on the design in step S111 (step S121).

For example, the worker reads an altitude (for example, an elevation) at each position of the track to be opened from a map, and obtains the position of a gradient change point and the altitude. Then, the worker calculates a gradient according to the design in each of zones obtained by delimiting the track to be opened at each of gradient change points.

Then, the worker generates onboard data (temporary data) such as a calculation rule of a speed limit in the digital ATC based on the gradient according to the design obtained in step S121, and registers the onboard data to the railroad vehicle 100 which is a test run vehicle (stores the onboard data in the control device 150) (step S122).

Here, in the construction process of step S112, a track is not necessarily constructed according to the design. For this reason, the gradient according to the design obtained in step S121 and the onboard data generated in step S122 may have an error.

When the construction in step S112 and the generating and registering of the onboard data in step S122 are completed, the worker performs test run by causing the railroad vehicle 100 to travel along the track to be opened, checks safety, and collects traveling data (step S131). The traveling data collected through the test run includes the notch step command value serving as the motor operation state information and the speed information of the railroad vehicle 100 measured by the speedometer 130.

Then, the worker acquires gradient information based on the traveling data obtained in step S131 using the gradient information acquisition device 300 (step S132). In other words, in step S132, the gradient information acquisition device 300 acquires (calculates) gradient information.

Then, the worker revises the onboard data generated in step S122 based on the gradient information obtained in step S132 (step S133). For example, the worker generates new onboard data based on the gradient information obtained in step S132 again, and stores the new onboard data in the control device 150 by replacing the onboard data generated in step S122.

As the onboard data is generated from the gradient information obtained based on the actual measurement data, the railroad vehicle (for example, the railroad vehicle 100) can be more accurately controlled.

Figure 3:
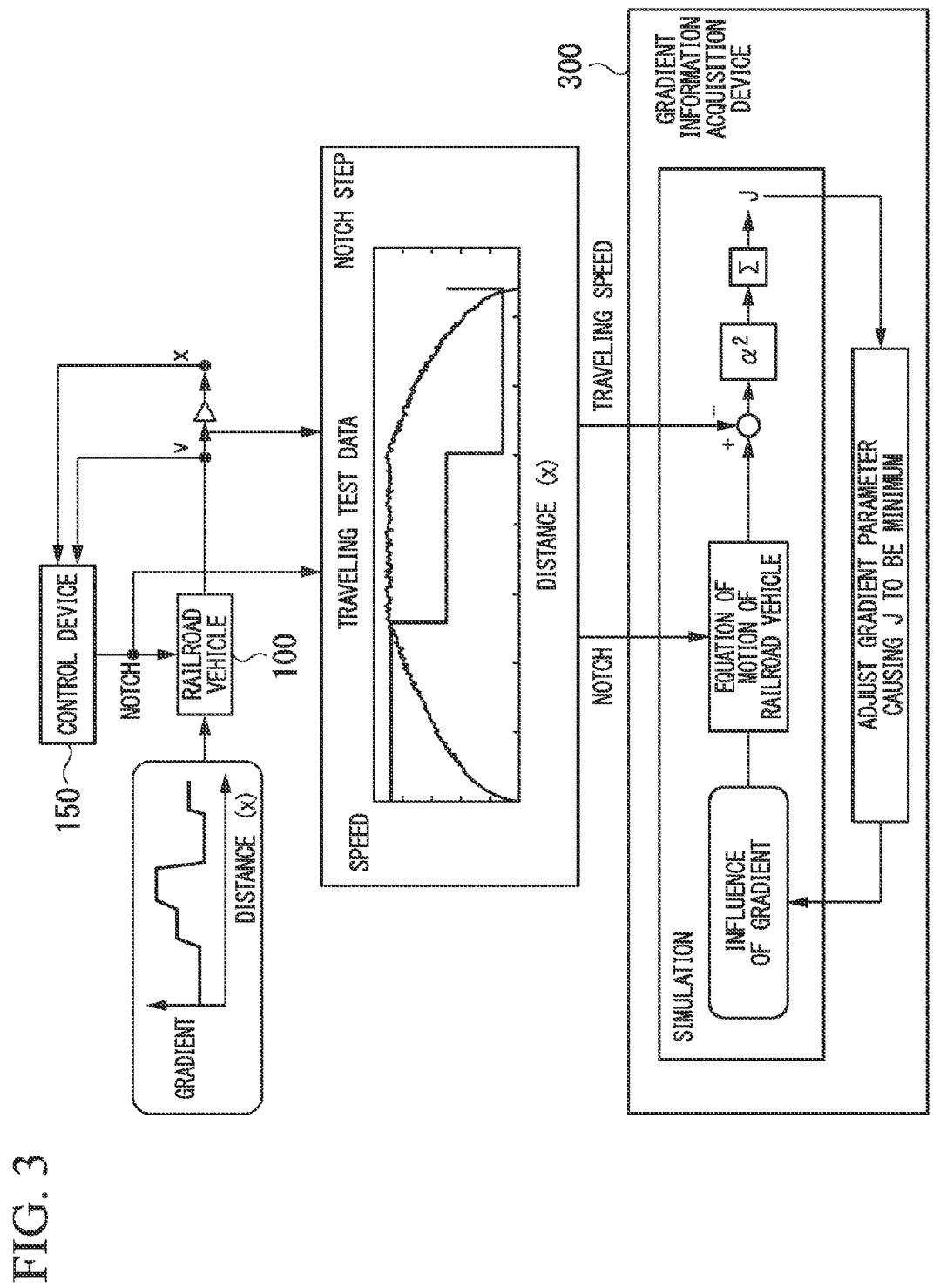
FIG. 3 is an explanatory diagram schematically illustrating a process of obtaining gradient information through a gradient information acquisition device according to the same embodiment.

FIG. 3 is an explanatory diagram schematically illustrating a process of obtaining the gradient information through the gradient information acquisition device 300. As illustrated in FIG. 3, the gradient information acquisition device 300 performs the traveling simulation of the railroad vehicle 100, and obtains the gradient information by comparing with test run data.

More specifically, the gradient information acquisition device 300 acquires the notch step command value serving as the motor operation state information and the speed information of the railroad vehicle 100 as the test run data. Here, as the motor 140 operates according to control of the control device 150, the railroad vehicle 100 travels while being affected by the track gradient. Then, the railroad vehicle 100 transmits the notch step command value used when the control device 150 controls the motor 140 and the speed information of the railroad vehicle 100 measured by the speedometer 130 to the gradient information acquisition device 300, and the gradient information acquisition device 300 acquires the information.

Further, the gradient information acquisition device 300 stores the equation of motion of the railroad vehicle 100 in advance (before the process of acquiring the gradient information starts), substitutes the motor operation state information included in the test run data into the equation of motion, and performs the traveling simulation of the railroad vehicle 100. Specifically, the gradient information acquisition device 300 calculates the traveling speed of the railroad vehicle 100 through the simulation.

For example, the gradient information acquisition device 300 stores the equation of motion represented by Formula (1) in advance.

[Formula 1]

$$m\ddot{x} = f(\dot{x}, n(t)) - mGg(x) - r(\dot{x}) - b(t) \quad (1)$$

Here, a constant m is a mass of the railroad vehicle 100, and a variable x represents a position of a center of gravity of the railroad vehicle 100. Specifically, the variable x represents a position of a center of gravity of the railroad vehicle 100 in a track of a gradient information acquisition target through a relative distance from a start point of the track.

Further, x dot represents a first-order differential (that is, the speed of the railroad vehicle 100) of the variable x according to a time, and x double dot represents a second-order differential (that is, acceleration of the railroad vehicle 100) of the variable x according to a time.

Further, a function f(x dot, n(t)) represents motor characteristics (powering and regeneration), and a function n(t) represents a command value on the motor 140 at a time t. The notch step command value at the time t which is represented by the motor operation state information is used as a value of the function n(t).

Further, a constant G represents acceleration of gravity, and a function g(x) represents a track gradient at a position x. The function g is an example of a function representing a gradient of a travel route of a railroad vehicle in the present invention. As will be described later, the function g has an adjustment parameter as an input parameter in addition to the position variable x.

Further, a function r(x dot) represents traveling resistance (excluding gradient resistance and regeneration resistance) such as air resistance when the railroad vehicle 100 travels at the speed x dot. Further, a function b(t) represents braking force working on the railroad vehicle 100 at the time t.

Thus, a first term on the right side of Formula (1) represents force working on the railroad vehicle 100 as the motor 140 operates, a second term on the right side represents force working on the railroad vehicle 100 according to a track gradient, a third term on the right side represents traveling resistance working on the railroad vehicle 100, and a fourth term on the right side represents force working on the railroad vehicle 100 as the braking device operates.

Further, for example, in Formula (1), the time t is represented by a relative time (an elapsed period of time from the reference time) having a test run start time as a reference time (a time "0"), a position of a center of gravity of the railroad vehicle 100 at the time 0 is assumed as a reference position (a position "0"), and the railroad vehicle 100 is assumed to be stationary at the time 0 (that is, a speed x dot is 0).

For example, the function f is decided in advance based on characteristics of the motor 140 using a constant of acceleration and a constant of a speed as adjustment parameters.

Figure 4:
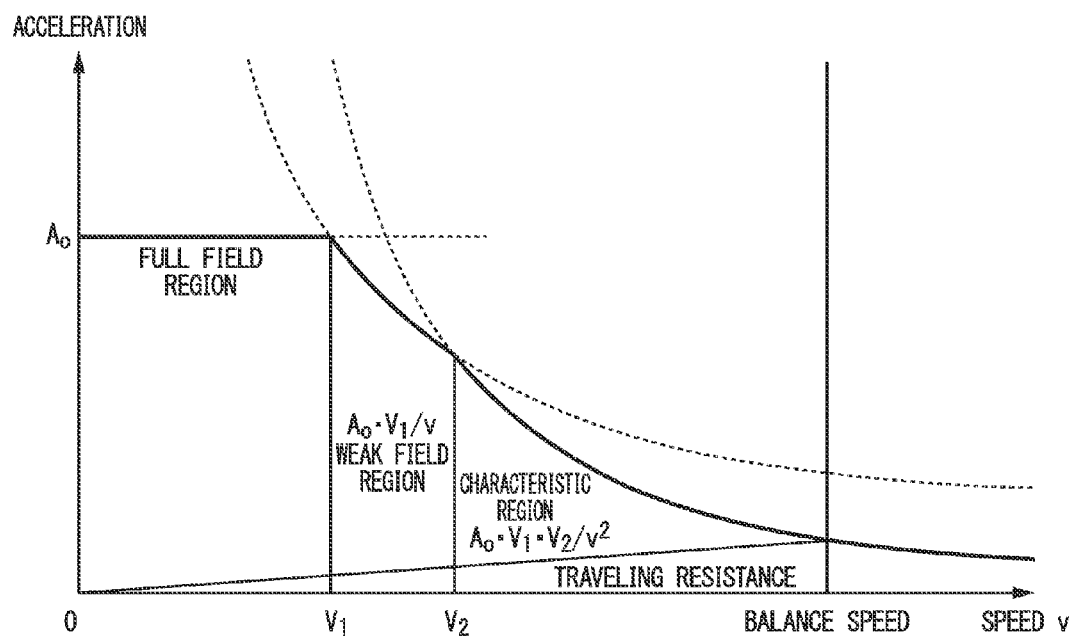
FIG. 4 is an explanatory diagram illustrating exemplary motor characteristics according to the same embodiment.

FIG. 4 is an explanatory diagram illustrating exemplary characteristics of the motor 140. As illustrated in FIG. 4, acceleration A(v) at a speed v of the motor 140 is expressed using a constant $A_0$ of acceleration and constants $V_1$ and $V_2$ of a speed as in Formula (2).

[Formula 2]

$$A(v) = \begin{cases} A_0 & \ldots \ v \leq V_1 \\ A_0 \cdot V_1 / v & \ldots \ V_1 \leq v \leq V_2 \\ A_0 \cdot V_1 \cdot V_2 / v^2 & \ldots \ V_2 \leq v \end{cases} \quad (2)$$

In this regard, based on Formula (2), the function f is expressed using the constant $A_0$ of the acceleration and the constants $V_1$ and $V_2$ of the speed as the adjustment parameters.

Further, similarly to an adjustment parameter of the function g representing a gradient which will be described later, values of the parameter constants (for example, $A_0$, $V_1$ and $V_2$) representing characteristics of the motor may be obtained by an optimization technique.

Further, the function r is expressed using, for example, constants a, b, and c as in Formula (3):

[Formula 3]

$$r(\dot{x}) = m(a + bv + cv^2) \quad (3)$$

Further, the function b is obtained in advance as a function of time based on operation information of the braking device in test run. In order to more accurately obtain the function b, for example, brake force by the braking device is measured in advance for each value of the speed of the railroad vehicle 100, an air pressure (of air brake), or a disk temperature, each value at each time is obtained based on data at the time of test run, and a value of the function b at each time is obtained.

Further, the function g is expressed using, for example, a position and an altitude at a gradient change point as adjustment parameters.

Figure 5:
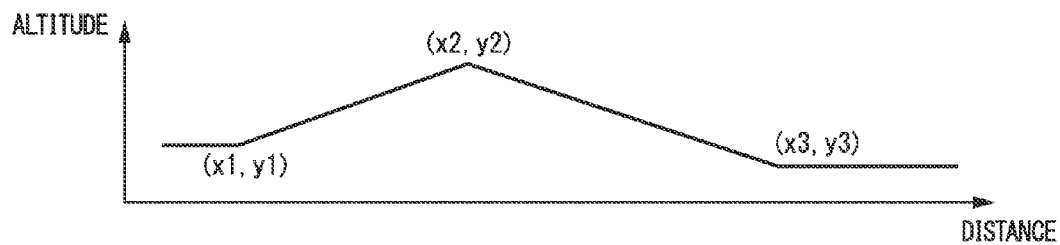
FIG. 5 is an explanatory diagram illustrating examples of a position and an altitude of a gradient change point serving as adjustment parameters of a function g according to the same embodiment.

FIG. 5 is an explanatory diagram illustrating examples of the position and the altitude of the gradient change point serving as the adjustment parameters of the function g. Referring to FIG. 5, constants x1, x2, and x3 represent distances in a track of a gradient information acquisition target, and constants y1, y2, and y3 represent altitudes of the track at the positions of x1, x2, and x3.

For example, the worker specifies the gradient change point based on the track design (step S111 of FIG. 2), sets the function g using the distance and the altitude at each gradient change point as the adjustment parameter, and stores the function g in the gradient information acquisition device 300 (the speed calculating unit 323) in advance.

When the test run data is acquired, the gradient information acquisition device 300 obtains the parameter value of the function g suitable for the test run data using, for example, a non-linear optimization technique such as the quasi-Newton method. For example, the gradient information acquisition device 300 (the speed calculating unit 323) sets a design value based on the track design as an initial value of each adjustment parameter of the function g, and calculates a calculation value $v_{si}$ of the speed of the railroad vehicle 100 at each time. Here, the calculation value $v_{si}$ of the speed is expressed as in Formula (4):

[Formula 4]

$$v_{si} = \dot{x}((i-1)\Delta t) \quad (4)$$

In other words, the calculation value $v_{si}$ of the speed is a sampling value of the calculation value of the speed of the railroad vehicle 100 for every period of time $\Delta t$.

Then, the gradient information acquisition device 300 (the parameter value acquiring unit 324) calculates an evaluation value J (a value of an evaluation function J(x1, y1, x2, . . . , xm, and ym); here, x1, y1, x2, . . . , xm, and ym are the adjustment parameters of the function g) of the calculation value $v_{si}$ of the speed based on Formula (5).

[Formula 5]

$$J = \sum_i (v_i - v_{si})^2 \quad (5)$$

Here, each value $v_i$, represents an actual measurement value (the measurement value of the speedometer 130) of the speed of the railroad vehicle 100 in test run.

Then, the gradient information acquisition device 300 (the parameter value acquiring unit 324) causes the speed calculating unit 323 to repeatedly calculate the calculation value $v_{si}$ based on the quasi-Newton method, and obtains parameter values (values of x1, y1, x2, . . . , xm, and ym) that minimizes the evaluation value J.

When the parameter values minimizing the evaluation value J are obtained, the gradient information acquisition device 300 (the railroad vehicle 100) obtains a gradient at each position of the track based on the obtained parameter values.

Next, an operation of the gradient information acquisition device 300 will be described with reference to FIG. 6.

Figure 6:
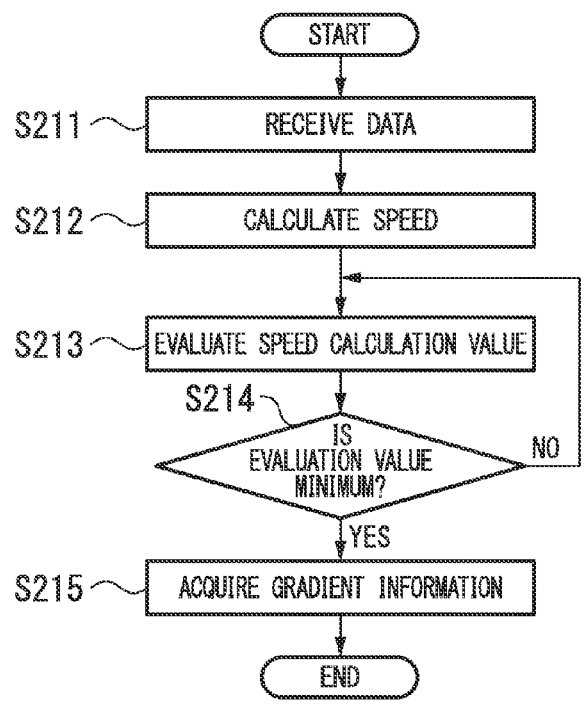
FIG. 6 is a flowchart illustrating a process of acquiring gradient information through a gradient information acquisition device according to the same embodiment.

FIG. 6 is a flowchart illustrating a process of acquiring the gradient information through the gradient information acquisition device 300. In the process of FIG. 6, first, the communication unit 310 receives the speed information of the railroad vehicle 100 (the measurement value of the speedometer 130) and the notch step command value serving as the motor operation state information as the test run data, and outputs the received test run data to the processing unit 320 (step S211).

Then, the speed calculating unit 323 applies the motor operation state information obtained in step S211 to the equation of motion of the railroad vehicle 100, obtains the calculation value $v_{si}$ of the speed of the railroad vehicle 100, and outputs the calculation value $v_{si}$ to the parameter value acquiring unit 324.

Then, the parameter value acquiring unit 324 evaluates a difference between the calculation value $v_{si}$ of the speed of the railroad vehicle 100 obtained in step S212 and the measurement value $v_i$ of the speed of the railroad vehicle 100 obtained in step S211 based on Formula (5) (step S213), and determines whether or not the evaluation value J is minimum (step S214).

When the evaluation value J is determined not to be the minimum (NO in step S214), the process returns to step S213, and the speedometer 130 obtains the calculation value $v_{si}$ of the speed of the railroad vehicle 100 on another parameter value.

Further, when the evaluation value J is determined to be the minimum in step S214 (YES in step S214), the parameter value acquiring unit 324 outputs the parameter value (the parameter value of the function g when the minimum value of the evaluation value J is obtained) when the speed is calculated to the gradient information acquiring unit 325, and the gradient information acquiring unit 325 obtains the track gradient based on the parameter value (step S215).

Thereafter, the process of FIG. 6 ends.

As described above, the gradient information acquisition device 300 (the parameter value acquiring unit 324) obtains the parameter value of the function g representing the gradient in which the difference between the calculation value of the speed of the railroad vehicle 100 and the measurement value of the speed of the railroad vehicle 100 is minimum, and the gradient information acquiring unit 325 obtains the track gradient based on the parameter value.

Through this operation, the railroad vehicle 100 preferably acquires information which can be acquired by a normal vehicle such as the speed information of the railroad vehicle 100 or information indicating the operation state of the motor 140. Thus, since a business vehicle can be used as the railroad vehicle 100 without a special vehicle (a dedicated inspection car), the manufacturing cost and the transportation cost of the railroad vehicle 100 can be reduced.

Further, the gradient information acquisition device 300 need not measure a gradient on a track on which the gradient information is obtained by manpower. Thus, the gradient information can be obtained in a relatively short period of time. Further, the gradient information acquisition device 300 can obtain an accurate gradient by obtaining the track gradient based on the test run data.

Further, a formula for evaluating a matching degree of the speed through the parameter value acquiring unit 324 is not limited to Formula (5), and various formulas in which a value decreases as the difference between the measurement value $v_i$ of the speed and the calculation value $v_{si}$ of the speed decreases may be used.

Further, the optimization technique used to obtain the parameter value causing the minimum speed through the gradient information acquisition device 300 is not limited to the quasi-Newton method. For example, various optimization techniques such as the steepest descent method or the Nelder-Mead technique can be used.

Further, when the parameters in the equation of motion are significantly different in a degree of influence (sensitivity) on the evaluation value J, a scale adjustment is performed so that the parameters are the same in the degree of influence.

Further, the adjustment parameters of the function g are not limited to the position and the altitude of the gradient change point.

Figure 7:
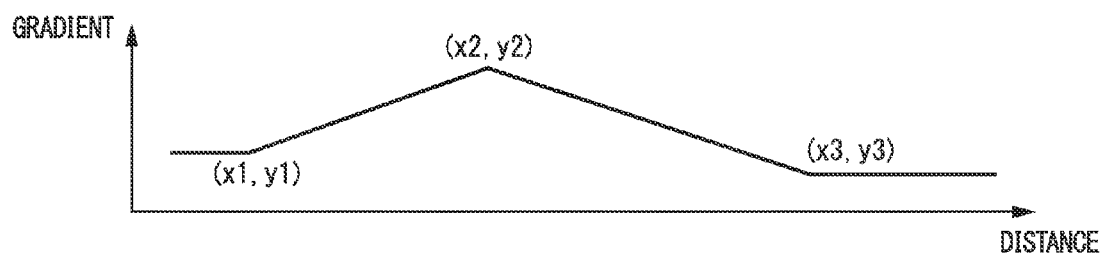
FIG. 7 is an explanatory diagram illustrating another example of adjustment parameters of the function g according to the same embodiment.

FIG. 7 is an explanatory diagram illustrating another example of adjustment parameters of the function g. In FIG. 7, constants x1, x2, and x3 represent distances in the track of the gradient information acquisition target, and constants y1, y2, and y3 represent a track gradient in zones x1 to x2, x2 to x3, and x3 to the remaining part.

For example, the worker specifies the gradient change point based on the track design (step S111 of FIG. 2), sets the function g using the distance at each gradient change point and the gradient in each zone as the adjustment parameters, and stores the function g in the gradient information acquisition device 300 (the speed calculating unit 323) in advance.

Even when the parameters other than the position and the altitude of the gradient change point are used as the parameters of the function g as described above, the gradient information acquisition device 300 can similarly obtain the track gradient.

Further, the gradient information acquisition device 300 may correct and use the measurement value of the speedometer 130.

Figure 8:
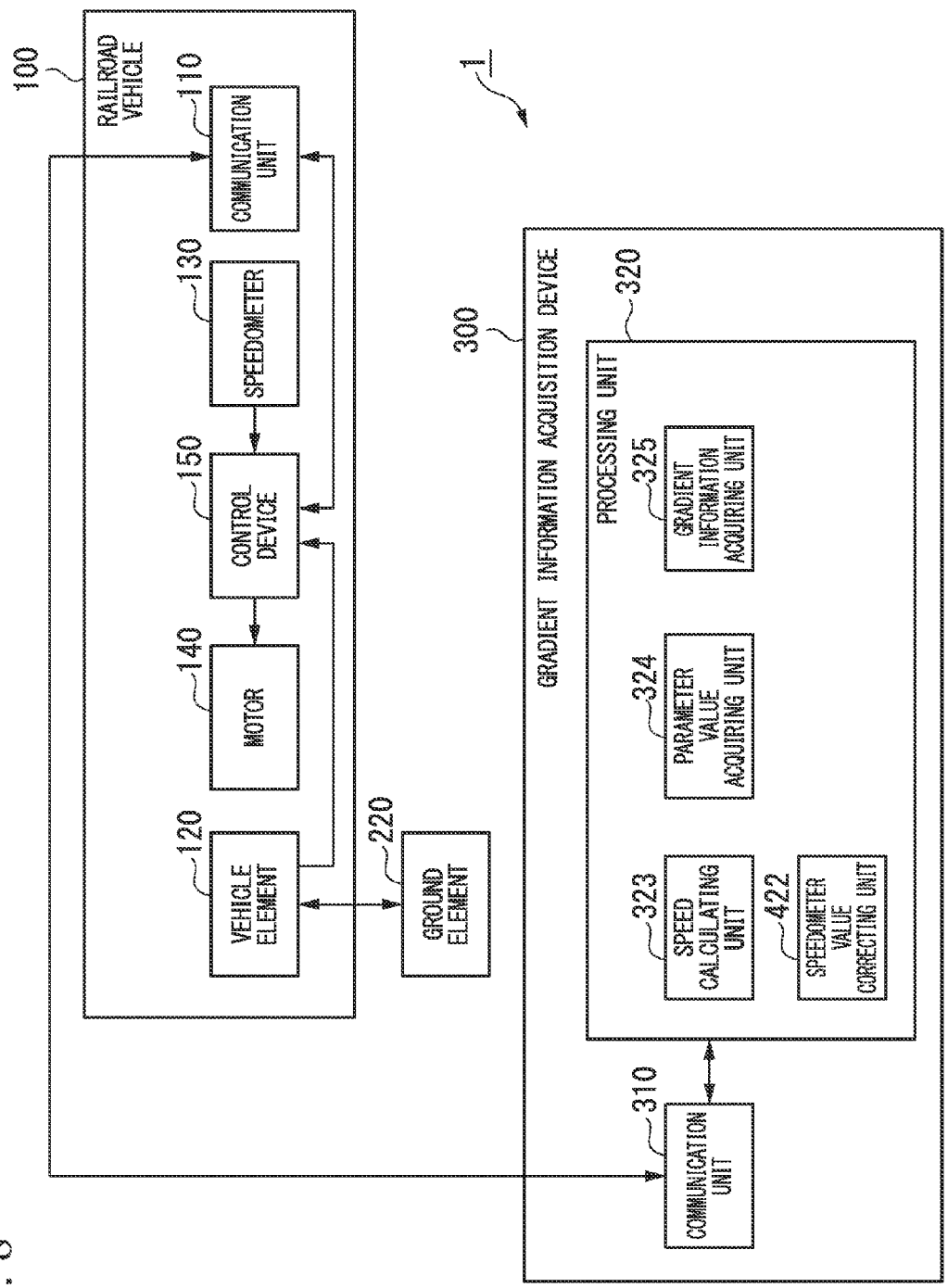
FIG. 8 is a schematic block diagram illustrating a functional configuration of a gradient information acquisition system when a gradient information acquisition device corrects and uses a measurement value of a speedometer according to the same embodiment.

FIG. 8 is a schematic block diagram illustrating a functional configuration of the gradient information acquisition system when the gradient information acquisition device 300 corrects and uses the measurement value of the speedometer 130. In the configuration illustrated in FIG. 8, in addition to the configuration illustrated in FIG. 1, the processing unit 320 includes a speedometer correcting unit 422, and a vehicle element 120 and a ground element 220 are further provided.

The vehicle element 120 is a device that is installed in the railroad vehicle 100 and capable of performing wireless communication. Further, the ground element 220 is a device that is installed on the track of the gradient measurement target and capable of performing wireless communication. When the vehicle element 120 is close to the ground element 220, communication is performed between the two elements. Further, the vehicle element 120 outputs data received from the ground element 220 to the control device 150. The control device 150 can detect that the railroad vehicle 100 has passed through the installation position of the ground element 220 using the data.

Further, the vehicle element 120 and the ground element 220 are preferably devices capable of detecting that the vehicle element 120 is close to the ground element 220 (steps upon the ground element 220). For example, the vehicle element 120 and the ground element 220 may be a vehicle element and a ground element (transponder) in ATC such as digital ATC. Thus, a vehicle element or a ground element which is dedicated for gradient measurement may not be installed.

The speedometer correcting unit 422 corrects the measurement value of the speedometer 130 using passage time information of the installation position of the ground element 220 detected by the railroad vehicle 100. The speedometer correcting unit 422 performs the correction as pre-processing of step S212 (that is, pre-processing of obtaining the calculation value of the speed of the railroad vehicle 100 through the speed calculating unit 323) in FIG. 6.

More specifically, first, the communication unit 310 acquires (receives) the measurement value of the speed of the railroad vehicle 100 measured by the speedometer together with the test run data. Further, a processing step of acquiring the measurement value of the speed of the railroad vehicle 100 measured by the speedometer through the communication unit 310 corresponds to a step of acquiring a speedometer measurement value in the present invention. In this step, the communication unit 310 functions as a so-called speedometer measurement value acquiring unit.

Further, the communication unit 310 acquires the passage time information of the ground element 220 of the railroad vehicle 100 detected by the railroad vehicle 100 together with the test run data. Further, the passage time of the ground element 220 of the railroad vehicle 100 corresponds to a time at which the railroad vehicle travels at a certain position in the present invention. Further, a processing step of acquiring the passage time information of the ground element 220 of the railroad vehicle 100 through the communication unit 310 corresponds to a step of acquiring a traveling time in the present invention. In this step, the communication unit 310 functions as a so-called traveling time acquiring unit.

Further, the speedometer correcting unit 422 corrects the measurement value of the speedometer 130 based on data acquired by the communication unit 310, and obtains the measurement value of the speed of the railroad vehicle 100. Further, a processing step of performing the correction by the speedometer correcting unit 422 corresponds to a step of correcting a speedometer measurement value in the present invention.

Figure 9:
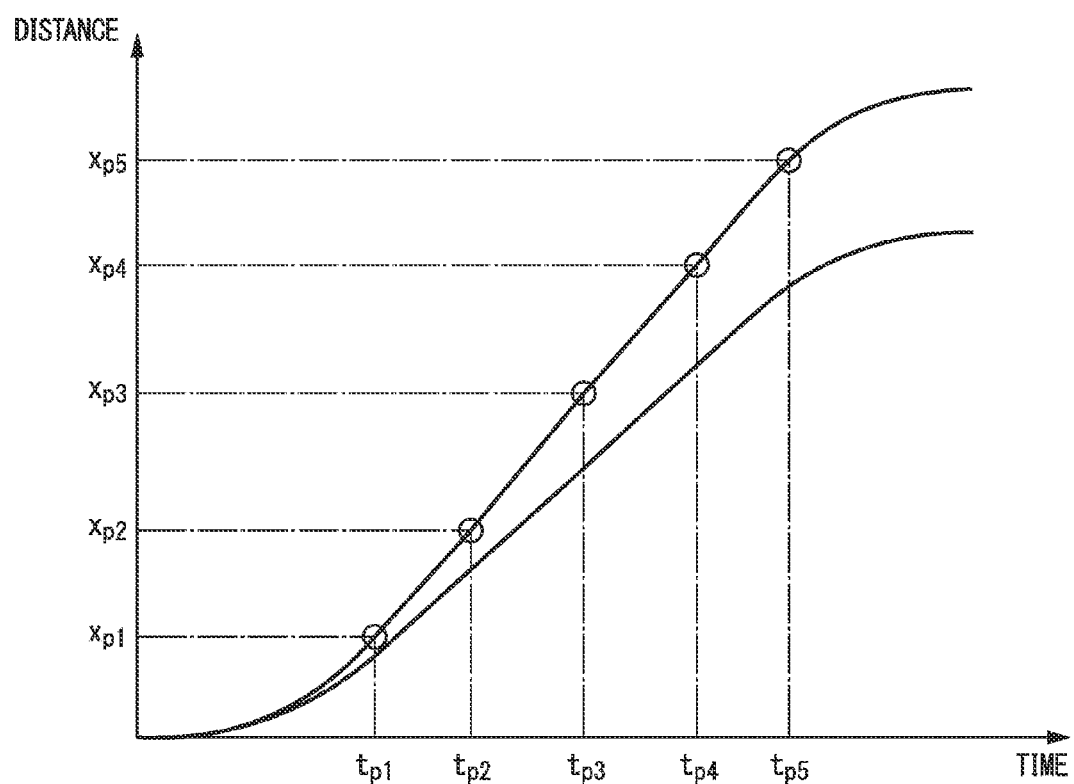
FIG. 9 is an explanatory diagram illustrating exemplary position information of a railroad vehicle obtained when a speedometer correcting unit corrects a speed according to the same embodiment.

FIG. 9 is an explanatory diagram illustrating exemplary position information of the railroad vehicle 100 obtained when the speedometer correcting unit 422 corrects the speed. In FIG. 9, positions $x_{p1}$ to $x_{p5}$ represent positions (distances from the reference position of the track) at which the ground elements 220 (hereinafter, referred to as ground elements p1 to p5) are installed. Further, times $t_{p1}$ to $t_{p5}$ represent times at which the railroad vehicle 100 passes through the positions of the ground elements p1 to p5.

Based on the position information and the time information, the speedometer correcting unit 422 performs, for example, a process of multiplying a measurement value correction coefficient of the speedometer 130.

For example, the speedometer correcting unit 422 obtains a value of a speedometer correction amount c and a value of a vehicle initial position error x0 in which the evaluation value $J_p$ is minimum based on Formula (6).

[Formula 6]

$$J_p = \sum_i \left( c \int_0^{t_{pi}} v\, dt + x_0 - x_{pi} \right)^2 \qquad (6)$$

Here, the speedometer correction amount c is a coefficient by which the measurement value of the speedometer 130 is multiplied. Further, the vehicle initial position error x0 represents an error between a position planned as an initial position of the railroad vehicle 100 and an actual initial position. As the speedometer correcting unit 422 performs the correction based on Formula (6), a correction amount (the value of the speedometer correction amount c and the value of the vehicle initial position error x0) in which an error between the position of each ground element 220 calculated based on the measurement value of the speed of the railroad vehicle 100 and the time at which the railroad vehicle 100 has passed through the ground element 220 and the actual position of each ground element 220 is minimum is obtained using the least-square technique.

Here, the optimization technique used when the speedometer correcting unit 422 obtains the correction amount is not limited to the least-square technique. The speedometer correcting unit 422 may obtain the correction amount using any other non-linear optimization technique.

As the speedometer correcting unit 422 corrects the measurement value of the speedometer 130 as described above, even when the error of the measurement value of the speedometer 130 is large, it is possible to reduce the error of the gradient obtained by the gradient information acquisition device 300.

Further, information which can be used for the speedometer correcting unit 422 to obtain the correction amount is not limited to information of the time at which the railroad vehicle 100 has passed through the ground element 220. For example, the speedometer correcting unit 422 may obtain the correction amount using test run start time information (information of a time at which the railroad vehicle 100 leaves a start station) or test run end time information (information of a time at which the railroad vehicle 100 arrives at a final station) in addition to or instead of the passage time information of the ground element 220.

Further, the gradient information acquisition device 300 may obtain gradient information of some zones of a track (a travel route of a gradient acquisition target) serving as a gradient information acquisition target.

For example, when it is difficult to perform highly accurate modeling for starting resistance immediately after the railroad vehicle 100 starts to travel, the gradient information acquisition device 300 may obtain more accurate gradient information by excluding a zone immediately after the railroad vehicle 100 starts to travel from the gradient information acquisition target. Further, when it is difficult to perform modeling for characteristics of the braking device of the railroad vehicle 100 accurately, the gradient information acquisition device 300 may obtain more accurate gradient information by excluding a braking device operation zone (a zone in which a brake is applied) from the gradient information acquisition target.

Figure 10:
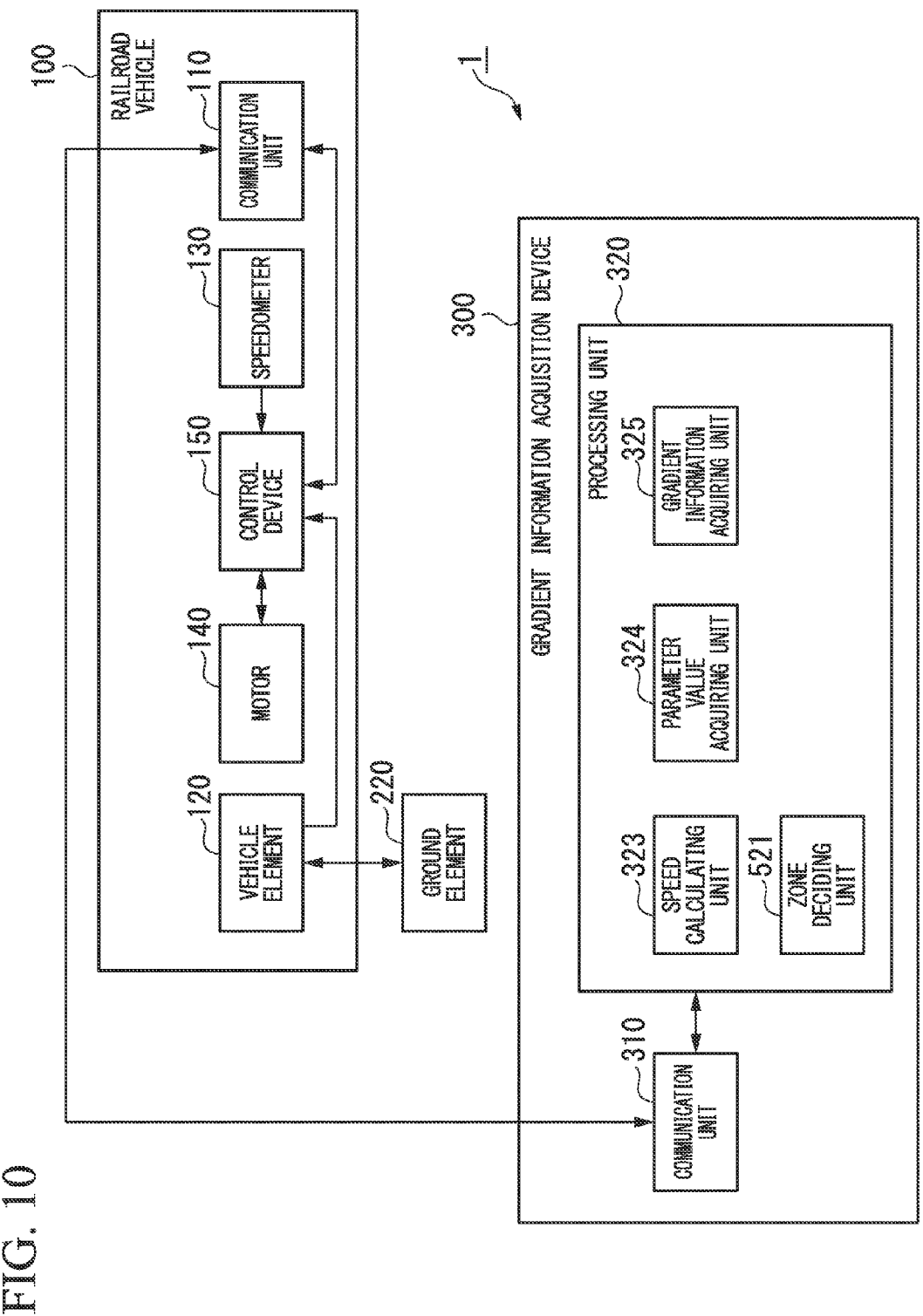
FIG. 10 is a schematic block diagram illustrating a functional configuration of a gradient information acquisition system when a gradient information acquisition device obtains gradient information of some zones of a track serving as a gradient information acquisition target according to the same embodiment.

FIG. 10 is a schematic block diagram illustrating a functional configuration of a gradient information acquisition system when the gradient information acquisition device 300 obtains gradient information of some zones of a track serving as a gradient information acquisition target. In the configuration illustrated in FIG. 10, in addition to the configuration illustrated in FIG. 1, the processing unit 320 includes a zone deciding unit 521.

The zone deciding unit 521 decides a zone in which the gradient information acquisition device 300 obtains a gradient (gradient information) in a travel route of a gradient acquisition target. Further, a processing step of deciding a zone in which the gradient information acquisition device 300 obtains a gradient (gradient information) in the travel route of the gradient acquisition target through the zone deciding unit 521 corresponds to a step of deciding a zone in the present invention.

The zone deciding unit 521 performs the deciding of the zone as pre-processing of step S212 (that is, pre-processing of obtaining the calculation value of the speed of the railroad vehicle 100 through the speed calculating unit 323) in FIG. 6. Further, when the gradient information acquisition device 300 includes the speedometer correcting unit 422 and corrects the measurement value of the speedometer 130, a process performed by the zone deciding unit 521 and a process performed by the speedometer correcting unit 422 may be performed in an arbitrary order or may be performed in parallel.

Figure 11:
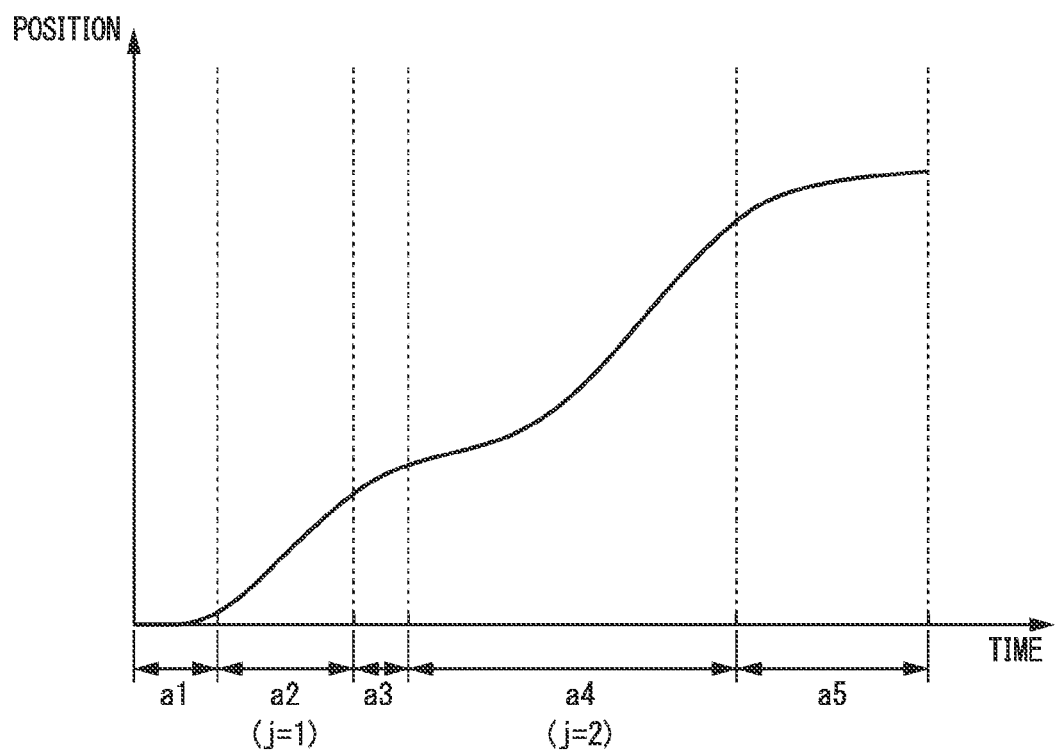
FIG. 11 is an explanatory diagram illustrating an exemplary zone decided as a zone in which a gradient is obtained by a zone deciding unit according to the same embodiment.

FIG. 11 is an explanatory diagram illustrating an exemplary zone decided as a zone in which a gradient is obtained by the zone deciding unit 521. In FIG. 11, a zone corresponding to times a2 and a4 is a zone selected by the zone deciding unit 521, and the number j indicates a serial number allocated to the zone.

Here, a time a1 indicates a time immediately after the railroad vehicle 100 starts to travel and is large in starting resistance. In this regard, the zone deciding unit 521 excludes the zone corresponding to the time a1 from the gradient information acquisition target. Further, in a time a3 and a time a5, the braking device of the railroad vehicle 100 is operated. In this regard, the zone deciding unit 521 excludes the zones corresponding to the time a3 and the time a5 from the gradient information acquisition target. Further, the zone deciding unit 521 selects the remaining zones (a zone corresponding to the time a2 and a zone corresponding to the time a4) as the zone of the gradient information acquisition target.

When the zone deciding unit 521 decides the zone of the gradient information acquisition target as described above, the equation of motion of the railroad vehicle 100 is expressed as in Formula (7).

[Formula 7]

$$m\ddot{x}_j = f(\dot{x}_j, n(t)) - mGg(x_j) - r(\dot{x}_j) \qquad (7)$$

Here, a variable $x_j$ represents a position (a distance from the reference position) in a j-th zone. Thus, $x_j$ dot represents the speed of the railroad vehicle 100 in the $j^{th}$ zone, and $x_j$ double dot represents the acceleration of the railroad vehicle 100 in the $j^{th}$ zone.

Further, an initial value in each zone is expressed as in Formula (8).

[Formula 8]

$$x_j(t_{j0}) = x_{j0}, \dot{x}_j(t_{j0}) = v_{j0} \qquad (8)$$

Here, a time $t_{j0}$ represents a time at which the railroad vehicle 100 enters the $j^{th}$ zone. Further, a position $x_{j0}$ represents a start position (a position closest to the reference position in the $j^{th}$ zone) of the $j^{th}$ zone. Further, a speed $v_{j0}$ represents the speed (measurement value) of the railroad vehicle 100 when the railroad vehicle 100 enters the $j^{th}$ zone.

The speed calculating unit 323 obtains a calculation value $v_{sji}$ of the speed of the railroad vehicle 100 expressed as in Formula (9) based on the equation of motion.

[Formula 9]

$$v_{sji} = \dot{x}_j((i-1)\Delta t) \qquad (9)$$

$v_{sji}$ represents the calculation value of the speed of the railroad vehicle 100 in the $j^{th}$ zone at an $i^{th}$ sampling time. The speed calculating unit 323 obtains the calculation value $v_{sji}$ of the speed of the railroad vehicle 100 at each sampling time of each zone.

Further, the parameter value acquiring unit 324 obtains parameter values (parameter values of the function g of the gradient) that minimize the difference between the calculation value and the measurement value using an evaluation value used to evaluate the difference between the calculation value and the measurement value of the speed of the railroad vehicle 100 in each zone of the gradient information acquisition target such as an evaluation value J' expressed as in Formula (10).

[Formula 10]

$$J' = \sum_j \sum_i (v_i - v_{sji})^2 \qquad (10)$$

As the zone deciding unit 521 decides the zone of the gradient information acquisition target as described above, the gradient information acquisition device 300 can acquire more accurate gradient information by excluding a zone (a zone in which it is difficult to obtain an accurate equation of motion) in which it is difficult to perform modeling accurately such as a zone in which starting resistance is large or a zone in which the braking device operates.

Further, for example, measuring of a gradient in a zone excluded from the gradient information acquisition target by the zone deciding unit 521 is performed by manpower.

Here, test run may be performed in both directions of the travel route (track) of the gradient acquisition target (that is, a round-trip along a track), and the zone deciding unit 521 may decide a zone in which the gradient information acquisition device 300 obtains a gradient (gradient information) in each direction of the travel route of the gradient acquisition target.

In this case, a zone in which the braking device is operated differs according to a direction in which test run is performed, and thus the zone deciding unit 521 is expected to decide more zones as the zone of the gradient information acquisition target. As a result, the number of zones in which a gradient is measured by manpower is reduced, and thus it is possible to obtain the gradient information rapidly and reduce a manpower for measuring a gradient.

Further, a program for implementing all or some functions of the gradient information acquisition device 300 may be recorded in a computer-readable recording medium, and the processes of the components may be performed by reading the program recorded in the recording medium to a computer system and executing the program. Further, here, the "computer system" is assumed to include an operating system (OS) and hardware such as peripheral devices.

Further, the "computer system" is assumed to include a home page provision environment (or display environment) when a WWW system is used.

Further, examples of the "computer-readable recording medium" include a portable medium such as a flexible disk, a magneto optical disc, a ROM, or a CD-ROM and a storage device such as a hard disk equipped in a computer system. Further, the "computer-readable recording medium" is a medium dynamically storing a program for a short period of time such as a communication line when a program is transmitted via a communication line such as a network such as the Internet or a telephone line and a medium storing a program for a certain period of time such as a volatile memory in a computer system serving as a server or a client in this case. Furthermore, the program may implement some functions among the above-described functions or may implement the above-described functions in combination with a program previously recorded in a computer system.

The exemplary embodiments of the present invention have been described above in detail with reference to the appended drawings, but a concrete configuration is not limited to the above embodiments, and for example, design changes can be made within the scope not departing from the gist of the invention.

INDUSTRIAL APPLICABILITY

The present invention can be widely applied to a gradient information acquisition device and a gradient information acquisition method, and it is possible to obtain gradient information in a relatively short period of time without requiring a dedicated inspection car.

DESCRIPTION OF THE REFERENCE SYMBOLS 1 gradient information acquisition system
100 railroad vehicle
110 communication unit
120 vehicle element
130 speedometer
140 motor
150 control device
220 ground element
300 gradient information acquisition device
310 communication unit
320 processing unit
323 speed calculating unit
324 parameter value acquiring unit
325 gradient information acquiring unit
422 speedometer correcting unit
521 zone deciding unit

The invention claimed is:

1. A gradient information acquisition method, comprising:
a speed measurement value acquiring step of acquiring a measurement value of a speed of a railroad vehicle;
a speed calculating step of obtaining a calculation value of the speed of the railroad vehicle using an equation of motion which simulates traveling of the railroad vehicle along a travel route, the equation of motion including a function representing a topological gradient of the travel route of the railroad vehicle, and the function representing the topological gradient of the travel route of the railroad vehicle including an adjustable parameter value;
a parameter value acquiring step of acquiring, using a non-linear optimization technique, a value of the adjustable parameter value minimizing a difference between (i) the calculation value of the speed of the railroad vehicle and (ii) the measurement value of the speed of the railroad vehicle; and
a gradient information acquiring step of acquiring the topological gradient of the travel route of the railroad vehicle based on the value of the adjustable parameter value acquired in the parameter value acquiring step,
wherein in the speed calculating step, a track design value of the topological gradient of a travel route of the railroad vehicle is used as an initial value of the adjustable parameter value to obtain the calculation value of the speed of the railroad vehicle.

2. The gradient information acquisition method according to claim 1,
wherein the speed measuring step further comprises
a speedometer measurement value acquiring step of acquiring the measurement value of the speed of the railroad vehicle by a speedometer;

a traveling time acquiring step of acquiring information of a time at which the railroad vehicle travels at a certain position; and a speedometer measurement value correcting step of correcting the measurement value of the speedometer based on data acquired in the traveling time acquiring step and obtaining the measurement value of the speed of the railroad vehicle.

3. The gradient information acquisition method according to claim 1, further comprising, a zone deciding step of deciding a zone in which a gradient is obtained by the gradient information acquisition method in a travel route of a gradient acquisition target.

4. The gradient information acquisition method according to claim 3, wherein, in the zone deciding step, the zone in which the gradient is obtained by the gradient information acquisition method is decided in both directions of the travel route of the gradient acquisition target.

5. A gradient information acquisition device, comprising:

a speed measurement value acquiring unit configured to acquire a measurement value of a speed of a railroad vehicle;

a speed calculating unit configured to obtain a calculation value of the speed of the railroad vehicle using an equation of motion which simulates traveling of the railroad vehicle along a travel route, the equation of motion including a function representing a topological gradient of the travel route of the railroad vehicle, and the function representing the topological gradient of the travel route of the railroad vehicle including an adjustable parameter value;

a parameter value acquiring unit configured to acquire, using a non-linear optimization technique, a value of the adjustable parameter value minimizing a difference between (i) the calculation value of the speed of the railroad vehicle and (ii) the measurement value of the speed of the railroad vehicle; and a gradient information acquiring unit configured to acquire the topological gradient of the travel route of the railroad vehicle based on the value of the adjustable parameter value acquired by the parameter value acquiring unit, wherein the speed calculating unit obtains the calculation value of the speed of the railroad vehicle using a track design value of the topological gradient of a travel route of the railroad vehicle as an initial value of the adjustable parameter value.

6. A non-transitory computer recording medium having stored thereon a program causing a computer functioning as a gradient information acquisition device to execute:

a speed measuring step of acquiring a measurement value of a speed of a railroad vehicle;

a speed calculating step of obtaining a calculation value of the speed of the railroad vehicle using an equation of motion which simulates traveling of the railroad vehicle along a travel route, the equation of motion, the equation of motion including a function representing a topological gradient of the travel route of the railroad vehicle, and the function representing the topological gradient of the travel route of the railroad vehicle including an adjustable parameter value;

a parameter value acquiring step of acquiring, using a non-linear optimization technique, a value of the adjustable parameter value minimizing a difference between (i) the calculation value of the speed of the railroad vehicle and (ii) the measurement value of the speed of the railroad vehicle; and a gradient information acquiring step of acquiring the topological gradient of the travel route of the railroad vehicle based on the value of the adjustable parameter value acquired in the parameter value acquiring step, wherein in the speed calculating step, a track design value of the topological gradient of a travel route of the railroad vehicle is used as an initial value of the adjustable parameter value to obtain the calculation value of the speed of the railroad vehicle.

* * * * *